United States Patent
Zhou et al.

(10) Patent No.: US 12,153,522 B2
(45) Date of Patent: Nov. 26, 2024

(54) METHOD AND DEVICE FOR DATA CACHING

(71) Applicant: SAMSUNG ELECTRONICS CO., LTD., Suwon-si (KR)

(72) Inventors: Yangxu Zhou, Suwon-si (KR); Fei Dong, Suwon-si (KR); Yan Jiang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/948,773

(22) Filed: Sep. 20, 2022

(65) Prior Publication Data
US 2024/0061782 A1 Feb. 22, 2024

(30) Foreign Application Priority Data
Aug. 18, 2022 (CN) .......................... 202210992490.2

(51) Int. Cl.
G06F 12/0846 (2016.01)
G06F 12/0877 (2016.01)

(52) U.S. Cl.
CPC ...... G06F 12/0848 (2013.01); G06F 12/0877 (2013.01); *G06F 2212/1021* (2013.01)

(58) Field of Classification Search
CPC ............. G06F 12/0848; G06F 12/0877; G06F 2212/1021
See application file for complete search history.

(56) References Cited

U.S. PATENT DOCUMENTS

| | | | |
|---|---|---|---|
| 6,915,248 B1 * | 7/2005 | Ip | G06F 30/33 703/17 |
| 9,547,830 B2 | 1/2017 | Eads | |
| 10,133,513 B1 | 11/2018 | Agans et al. | |
| 10,216,639 B2 | 2/2019 | Maheshwari | |
| 10,592,115 B1 | 3/2020 | Izhar et al. | |
| 10,853,246 B2 | 12/2020 | Randolph et al. | |
| 10,936,320 B1 | 3/2021 | Ekanadham et al. | |
| 11,080,283 B1 | 8/2021 | Wondo et al. | |
| 2015/0309933 A1 | 10/2015 | Nellans et al. | |
| 2016/0034396 A1 | 2/2016 | Damodaran et al. | |
| 2016/0283394 A1 * | 9/2016 | Chahal | G06F 3/0631 |
| 2020/0201773 A1 * | 6/2020 | Alagumuthu | G06F 12/0871 |
| 2020/0310654 A1 * | 10/2020 | Meiri | G06F 3/0653 |
| 2021/0096930 A1 * | 4/2021 | Shafi | G06F 12/0868 |
| 2022/0066691 A1 | 3/2022 | Zhang et al. | |

OTHER PUBLICATIONS

Communication dated Aug. 23, 2023, issued by the European Patent Office in counterpart European Application No. 22200475.6.

* cited by examiner

*Primary Examiner* — Baboucarr Faal
(74) *Attorney, Agent, or Firm* — Sughrue Mion, PLLC

(57) ABSTRACT

A method is provided. The method includes: obtaining a cache value of data corresponding to an access request; and determining whether to access the data corresponding to the access request from a cache device or a storage device based on whether the cache value meets a preset condition.

18 Claims, 8 Drawing Sheets

METHOD AND DEVICE FOR DATA CACHING

CROSS-REFERENCE TO RELATED APPLICATION

This application claims priority to Chinese Patent Application No. 202210992490.2, filed on Aug. 18, 2022, in the China National Intellectual Property Administration, the disclosure of which is hereby incorporated by reference in its entirety.

BACKGROUND

1. Field

The present disclosure generally relates to data storage, and more particularly, to a method and device for data caching.

2. Related Art

Cache systems with block devices include Open Cache Acceleration Software (Open-CAS), Device Mapper-Cache (DM-Cache) and Block Cache (BCache). Such cache systems with block devices use a fast block device as a cache device and a slow block device as a back-end device to improve an overall performance of a storage system by using the characteristics of fast reading and writing of the cache device.

In the related art, a cache system may use a Write-Through strategy, a Write-Back strategy or a Write-Around strategy.

In the Write-Through strategy, data for a write operation is written to a cache device and a back-end device at the same time. This strategy is suitable for a scenario where a small amount of data is frequently read after being written.

In the Write-Back strategy, data for a write operation is only written to a cache device, and then the data for the write operation is asynchronously flushed from the cache device to a back-end device. This strategy is suitable for a scenario where reading and writing are intensive.

In the Write-Around strategy, data for a write operation is directly written to a back-end device, and when the data is read, the data is written to a cache device. This strategy is suitable for a scenario where data is written once and rarely read.

Simultaneously, a strategy for reading includes first accessing data for a read operation from a cache device, and then accessing the data for the read operation from a back-end device if the data for the read operation is not hit in the cache device.

In the related cache systems, the corresponding reading and writing strategies are usually deployed according to a type of upper-layer business. Once a strategy is deployed, the strategy cannot be changed while the system is running, and thus the system cannot dynamically respond to changes in business data and complex workloads. For example, a cache value of data in a back-end device may change as the workload changes, fixed caching strategies result in the data not being properly written to a cache device, and thus caching data using the initially deployed caching strategies will not be able to effectively utilize resources of a storage system.

SUMMARY

One or more embodiments provide a method and device for data caching, which may dynamically adjust a caching strategy according to an actual cache value of data corresponding to an access request to effectively utilize resources of a storage system, thereby improving access performance of the storage system.

According to an aspect of an example embodiment, a method includes: obtaining a cache value of data corresponding to an access request; and determining whether to access the data corresponding to the access request from a cache device or a storage device based on whether the cache value meets a preset condition.

According to an aspect of an example embodiment, a device includes: one or more memories storing instructions; and one or more processors configured to execute the instructions to implement: an obtaining unit configured to obtain a cache value of data corresponding to an access request; and a determining unit configured to determine whether to access the data corresponding to the access request from a cache device or a storage device based on whether the cache value meets a preset condition.

According to an aspect of an example embodiment, a computer-readable storage medium stores a computer program which, when executed by a processor, is configured to control the processor to perform a method including: obtaining a cache value of data corresponding to an access request; and determining whether to access the data corresponding to the access request from a cache device or a storage device based on whether the cache value meets a preset condition.

BRIEF DESCRIPTION OF DRAWINGS

The above and other aspects will be more apparent from the following description of example embodiments taken in conjunction with the accompanying drawings, in which.

DETAILED DESCRIPTION

Figure 1:
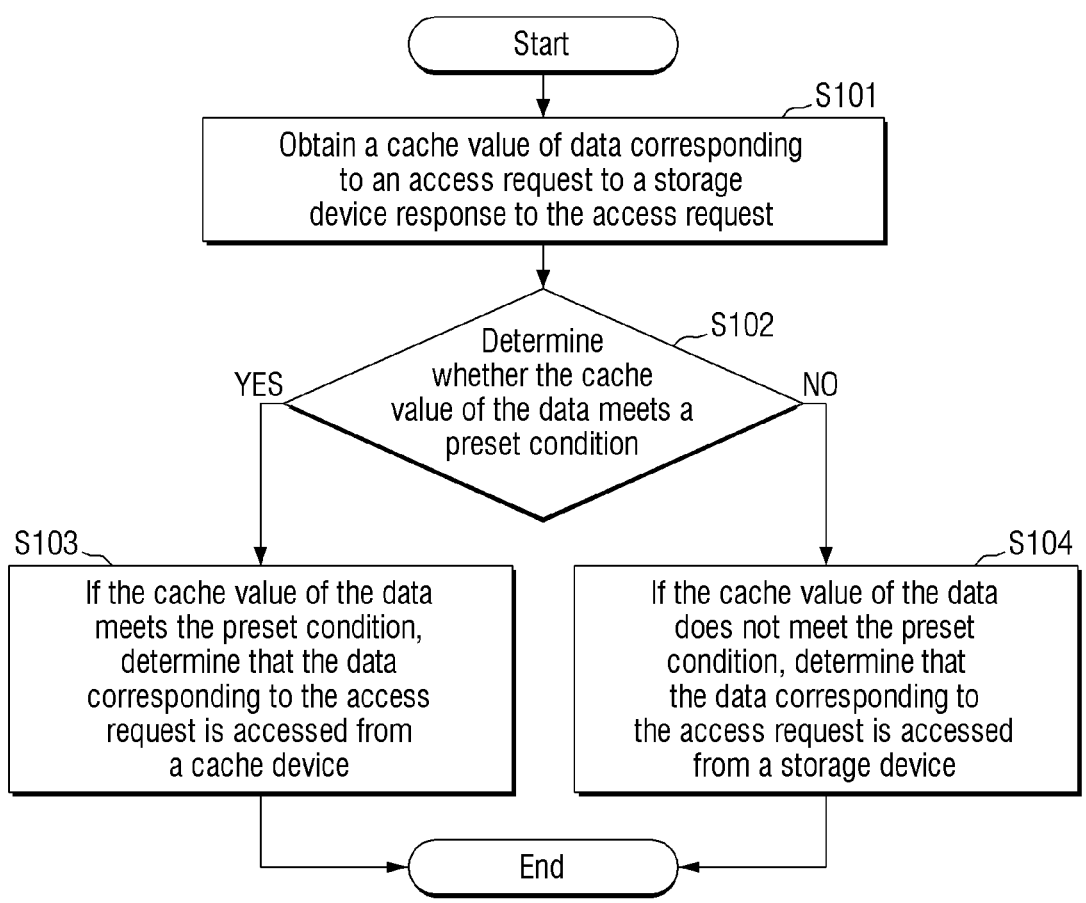
FIG. 1 is a flowchart illustrating a method for data caching according to an embodiment.

Hereinafter, embodiments are described with reference to the accompanying drawings, in which like reference numerals are used to depict the same or similar elements, features, and structures. Embodiments described herein are example embodiments, and thus, the present disclosure is not limited thereto, and may be realized in various other forms. Each embodiment provided in the following description is not excluded from being associated with one or more features of another example or another embodiment also provided herein or not provided herein but consistent with the present disclosure. The present disclosure is not intended to be limited by the specific embodiments described herein to a specific embodiment and it is intended that the present disclosure covers all modifications, equivalents, and/or alternatives of the present disclosure, provided they come within the scope of the appended claims and their equivalents. The terms and words used in the following description and claims are not limited to their dictionary meanings, but, are used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms include plural forms, unless the context clearly dictates otherwise. The terms "include," "comprise," and "have", used herein, indicate disclosed functions, operations, or the existence of elements, but does not exclude other functions, operations, or elements.

The term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In various embodiments of the present disclosure, it is intended that when a component (for example, a first component) is referred to as being "coupled" or "connected" with/to another component (for example, a second component), the component may be directly connected to the other component or may be connected through another component (for example, a third component). In contrast, when a component (for example, a first component) is referred to as being "directly coupled" or "directly connected" with/to another component (for example, a second component), another component (for example, a third component) does not exist between the component and the other component.

The expression "configured to", used in describing various embodiments of the present disclosure, may be used interchangeably with expressions such as "suitable for," "having the capacity to," "designed to," "adapted to," "made to," and "capable of", for example, according to the situation. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general purpose processor (for example, a central processing unit (CPU) or an application processor (AP)) for performing corresponding operations by executing at least one software program stored in a memory device.

The terms used herein are to describe certain embodiments of the present disclosure, but are not intended to limit the scope of other embodiments. Unless otherwise indicated herein, all terms used herein, including technical or scientific terms, may have the same meanings that are generally understood by a person skilled in the art. In general, terms defined in a dictionary should be considered to have the same meanings as the contextual meanings in the related art, and, unless clearly defined herein, should not be understood differently or as having an excessively formal meaning. In any case, even terms defined in the present disclosure are not intended to be interpreted as excluding embodiments of the present disclosure.

Caching systems with block devices, such as Open-CAS, DM-Cache and BCache that, accelerate the Input and Output (IO) access to back-end block storage devices by using storage devices with higher-performance. For example, Storage Class Memory (SCM), Samsung Z-SSD, PRAM, Single Level Cell (SLC) and Solid State Disk (SSD) are ultra-low latency block devices that may be used as cache devices, and the back-end devices may be Multi-Level Cell (MTC) SSD, Trinary-Level Cell (TLC) SSD, Quali-Level-Cell (QLC) SSD, Hard Disk Drive (HDD) and the like.

In order to more effectively accelerate the IO access to the back-end block storage device, the present disclosure proposes a method and device for data caching. Those skilled in the art should understand that the method and device for data caching of the present disclosure may be applied to any storage system including a cache device and a back-end device.

FIG. 1 is a flowchart illustrating a method for data caching according to an embodiment.

Referring to FIG. 1, in operation S101, a cache value of data corresponding to an access request to a storage device is obtained in response to the access request. In the following description, a storage device and a back-end storage device have the same or similar meaning, and a cache and a cache device have the same or similar meaning.

As an example, the cache value of the data corresponding to the access request may be a data cache value of a logical partition to which a logical address of the data corresponding to the access request belongs.

As an example, in order to reduce a burden of a system, a back-end device may be divided into a plurality of logical partitions by partitioning logical addresses mapped by the back-end device, and the cache value of the data stored in respective logical partitions may be managed in units of logical partitions.

It should be noted that the back-end device may be divided into a plurality of logical partitions, and the specific number of the logical partitions and sizes of the logical partitions may be set according to an actual situation. For example, the sizes of the logical partitions may be the same or different.

Correspondingly, obtaining the cache value of the data corresponding to the access request may include obtaining a cache value of the logical partition to which a logical address of the data corresponding to the access request belongs. For example, the specific operations may include: determining a logical partition to which a logical address of the data corresponding to the access request belongs; and obtaining a data cache value of the logical partition to which the logical address of the data belongs as the cache value of the data corresponding to the access request. The storage device may be divided into a plurality of logical partitions, and each logical partition may have a corresponding data cache value.

It should be understood by those skilled in the art that the cache value may be hot level information of the data indicating how frequently the data is accessed, or the number of times the data being accessed within a predetermined period of time and the like. Of course, the present disclosure does not impose specific restrictions on the cache value and the cache value may be any metric information that may be used for determining whether the data needs to be cached.

As an example, read and write requests corresponding to each logical partition may vary as the workload changes, which may cause the data cache value of the each logical partition to vary. For example, in a first period of time, data corresponding to a certain logical partition may be data that is frequently accessed, and therefore, a data cache value of the certain logical partition is high. If there is a write request for the logical partition in the first time period, the data corresponding to the write request should be written into the cache device. In a second period of time, the data corresponding to the certain logical partition may not be frequently accessed, and thus, in the second time period, the data cache value of the certain logical partition is low. At this time, if there is a write request for the logical partition in the second time period, the data corresponding to the write request should be written to the back-end device, so as to prevent the data with a low data cache value from being stored in the cache device. Because the read and write requests corresponding to respective logical partitions may be different, each logical partition has its own corresponding data cache value.

In this regard, if a data cache value of a logical partition (or data corresponding to the logical partition) may be reasonably predicted, and the data corresponding to the logical partition is written into the cache or the back-end storage device according to the predicted data cache value of the logical partition (or, the data corresponding to the logical partition is read from the cache or the back-end storage device according to the data cache value of the logical partition), such reading and writing strategy may dynamically determine whether to write the data into the cache device according to the actual cache value of the data, which effectively reduces dirty data of the cache device caused by related methods, improves a hit rate of accessing the data from the cache and effectively reduces a time delay of reading the data. Compared with the Write-Through operation, the delay for the write operation may be effectively reduced; and compared with the Write-Back operation and the Write-Around operation, the pressure of write operations for a single device may be reduced (the Write-Back operation and the Write-Around operation only write data into the cache device or only write the data into the back-end device).

As an example, a data cache value of a logical partition to which the logical address of the data corresponding to the access request or the cache value of the data corresponding to the access request is obtained according to historical access information of the logical partition to which the logical address of the data belongs.

Because there is a time correlation for data access, it is likely that data that has been previously accessed many times will be accessed many times in the future, and because locations (logical partitions) for storing data are basically fixed, the future access information of the data may be predicted according to historical access information of the locations (logical partitions) storing the data.

Those skilled in the art should understand that access information of the logical partition may refer to at least one of the number of times that the logical partition is accessed and a size of the data that is accessed. In order to facilitate understanding, the number of times the logical partition is accessed is taken as an example of the access information for description below. In addition, the number of times of access to a logical partition and the number of times that the logical partition is accessed may be used interchangeably hereinafter for the convenience of description. As an example, a machine learning model for predicting the number of times of access or a data cache value of a logical partition may be trained, and the trained machine learning model may be used to predict the number of times of access or the data cache value of the logical partition.

As an example, a prediction model based on Long Short-Term Memory (LSTM) is taken as an example to describe the offline training process and online usage process of the machine learning model.

Figure 2:
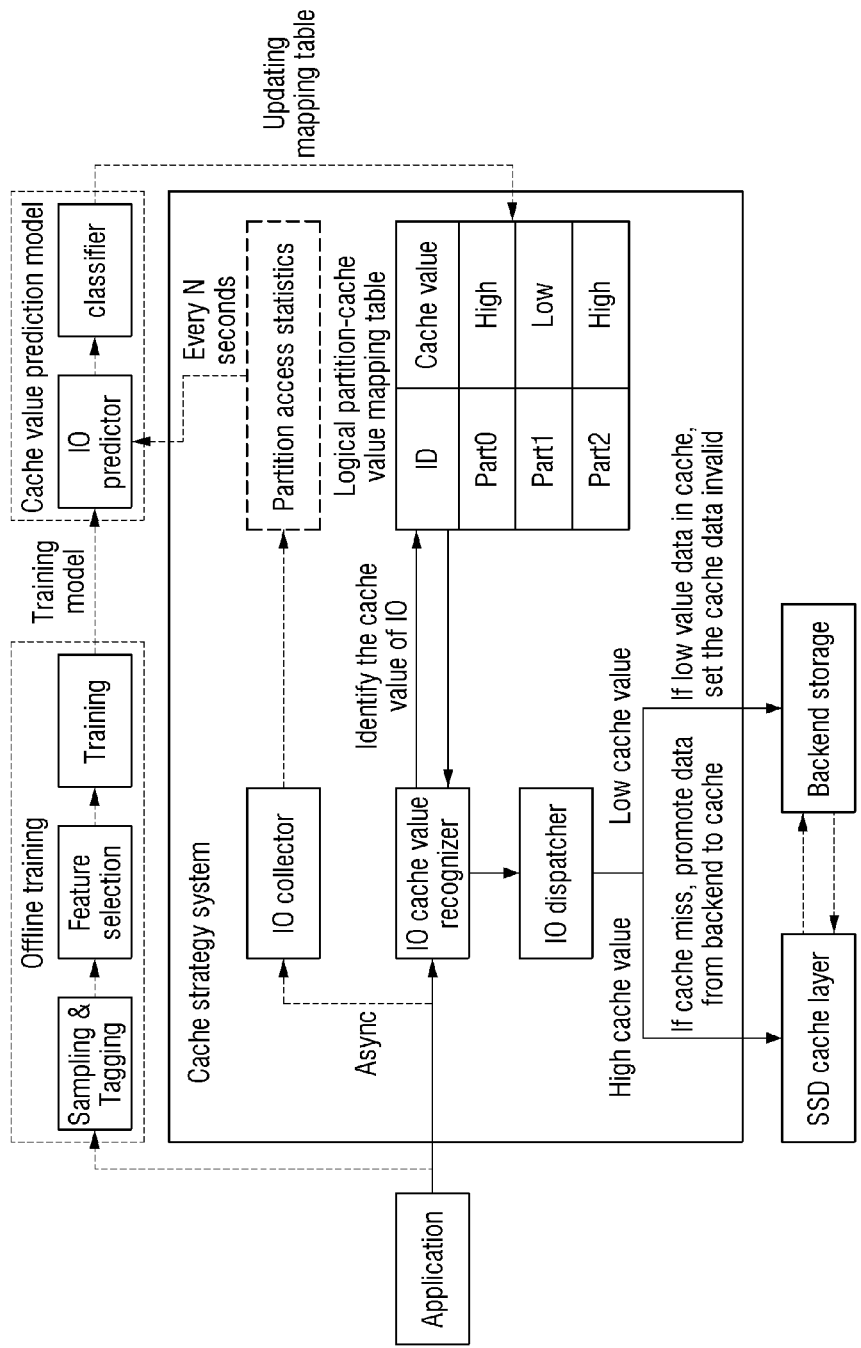
FIG. 2 is a diagram illustrating an overall architecture of a data storage solution according to an embodiment.

FIG. 2 is a diagram illustrating the overall architecture of a data storage scheme according to an embodiment.

Referring to FIG. 2, the cache value prediction model may include an IO predictor and a classifier.

First, an example of the offline training of the LSTM-based prediction model is described as follows:

1) The number of times of IO requests for each logical partition and/or sizes of data corresponding to the requests at each moment (or each period of time) may be counted (for example, through the IO collector), that is, access information of respective logical partitions at each moment or each period of time is counted, and the counted data may be stored in a record file. Compared with counting access information for a single request, counting access information in units of logical partitions may effectively reduce memory usage and computing load. Those skilled in the art should understand that the term "moment" in the following may be replaced by "period of time", and an interval of the period of time may be a preset value.

2) The numbers of times of access to 2M logical partitions adjacent to the nth logical partition before and after and the nth logical partition (2M+1 logical partitions in total) from the h−H+1th moment to the hth moment (the numbers of times of access may be represented in a two-dimensional vector of [H,2M+1]), and the number of times of access to the nth logical partition at the h+1th moment (or period of time) may be used as training data to train the IO predictor.

Wherein, n is an index of the logical partition, n=1, . . . N, N is the number of divided logical partitions of the back-end device, H is the number of times the collector collects workload data, for example, workload data of H moments within a preset period of time may be collected, or workload data of H preset periods of time is collected and the workload data may be the numbers of times of access. M is a positive integer.

Wherein, h is an index of the moment or the period of time, and H is a preset value.

In the following description, a logical partition and a partition have the same or similar meaning and are used interchangeably.

For example, when M is 2, H is 10, and n is 8, h is 20, and the 2M partitions preceding and following adjacent to the 8th partition are the 6th, 7th, 9th, and 10th partitions. Thus, the training data may indicate the number of times of access to each partition of the 6th, 7th, 8th, 9th, and 10th partitions in each of the 11th to 20th period of time (that is, the numbers of times of access is a two-dimensional vector with a size of [10,5]) and the number of times of access to the 8th partition in the 21st time period (that is, the number of times of access is a two-dimensional vector with a size of [1,1]). Those skilled in the art should understand that the 2M partitions adjacent to a partition may be selected in other manners, for example, 2M partitions preceding the current partition, 2M partitions following the current partition, or 2M-X partitions preceding the current partition and X partitions following the current partition may be selected, wherein X is a preset value, and 0<X<2M.

Those skilled in the art should understand that the IO predictor may be trained by using the access information of the logical partitions corresponding to the loads of various scenarios, which makes it possible to predict future access information of the logical partitions more accurately when predicting the access information of the logical partitions using the trained IO predictor.

An example of the online usage process of the trained IO predictor is described as follows:

1) Access information of respective logical partitions at each moment or each period of time is recorded by using the IO collector. As an example, the access information may be counted every preset time interval.

2) When the number of times provided in the historical records of each logical partition exceeds a preset value (for example, H), the trained IO predictor may be used to predict the access information of each logical partition.

As an example, the historical access information of the logical partition to which the logical address of the data belongs and historical access information of other logical partitions within the same time period may be input into a trained IO predictor to predict the data cache value of the logical partition to which the logical address of the data belongs. The other logical partitions may include a preset number of logical partitions adjacent to the logical partition to which the logical address of the data belongs.

Figure 3:
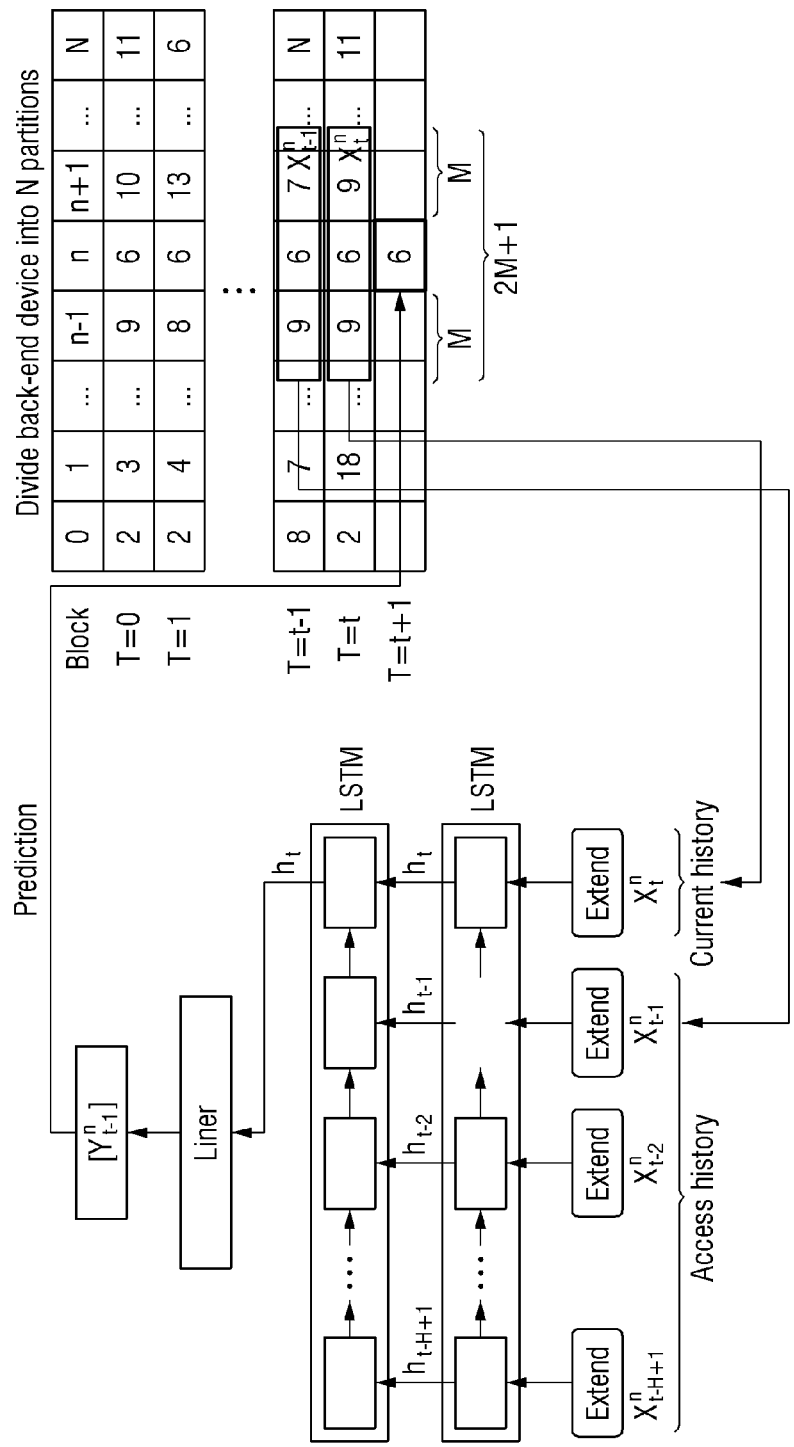
FIG. 3 illustrates a schematic diagram of predicting the number of times of access to a logical partition based on a trained IO predictor according to an embodiment.

FIG. 3 illustrates a schematic diagram of predicting the number of times of access to a logical partition based on the trained IO predictor according to an embodiment.

For example, the numbers of times of access to 2M logical partitions preceding and following adjacent to the nth (an index of logical partitions) logical partition and the nth logical partition (2M+1 logical partitions in total) at each of the t−H+1th moment to the tth moment (a two-dimensional vector with a size of [H, 2M+1]) are input to the trained IO predictor (wherein t is the index of the moment, and H is a preset value), and the output of the IO predictor is the predicted number of times of access to the nth logical partition at the t+1th moment (or period of time), wherein a time interval from the t−H+1th moment to the tth moment is the same period of time, and the tth moment is the current moment.

For example, for the 9th partition, if the next period of time is the 11th period of time or moment (i.e., t+1=11), the numbers of times of access to the 7th logical partition, the 8th logical partition, the 9th logical partition, the 10th logical partition and the 11th logical partition at each of the 1st period of time to the 10th period of time are input into the trained IO predictor, and then the predicted number of times of access to the 9th logical partition at the next period of time (i.e., the 11th period of time or moment) may be obtained.

As an example, regardless of the training stage of the machine learning model or the inference stage of the machine learning model, if the number of logical partitions preceding or following the nth logical partition is less than M, the number of times of access of the missing logical partition is replaced by a preset value, for example, the preset value may be set to be 0.

As another example, in the training stage of the machine learning model or in the inference stage of the machine learning model, if the number of logical partitions preceding the nth logical partition is less than M (for example, the number is m), the m partitions and 2M-m partitions following the nth partition are used as the 2M partitions preceding and following adjacent to the nth partition, and if the number of logical partitions following the nth logical partition is less than M (for example, the number is m), the m partitions and 2M-m partitions preceding the nth partition are used as the 2M partitions preceding and following adjacent to the nth partition.

Those skilled in the art should understand that the selection manner of adjacent logical partitions used for training the IO predictor is the same as the selection manner of adjacent logical partitions used when predicting access information through the trained IO predictor.

According to an embodiment, because there are temporal correlation and spatial correlation among access information of logical partitions, access information of a logical partition in the future may be effectively predicted based on historical access information of the logical partition and historical access information of logical partitions adjacent to the logical partition.

It is possible to predict the number of times of access for each logical partition at the next moment (or period of time) by using the trained IO predictor.

As an example, data cache values of respective partitions may be determined based on the predicted numbers of times of accesses of respective partitions.

As an example, data cache values of respective logical partitions may be predicted by a cache value classifier based on the predicted numbers of times of access to respective partitions in a clustering method (e.g., Kmeans++). Specifically, for example, the cache value classifier may be used to cluster the predicted numbers of times of access to respective partitions at a next moment or a next period of time (for example, the next moment or time period is the t+1th moment or period of time and the size of the period of time may be preset, for example, 3 seconds) into K clusters, logical partitions corresponding to L clusters with larger cluster center values among the K clusters are determined to have a high data cache value, and logical partitions corresponding to the remaining clusters are determined to have a low data cache value, wherein L is a predetermined value. The low data cache value indicates that the logical partitions will not be accessed frequently, and the high data cache value indicates that the logical partitions will be accessed frequently. It should be understood by those skilled in the art that the predictor and the classifier can be trained separately in the offline stage, and of course they may also be trained together.

As an example, when the number of times of historical records for access information of the logical partition is not greater than a preset value (e.g., the preset value is H), the trained prediction model cannot be used. In this case, the data cache values of respective logical partitions at the next moment (or period of time) may be predicted by the following operations: clustering the numbers of times of access to respective logical partitions before the next moment (or period of time); determining, among a plurality of clusters obtained by the clustering, logical partitions corresponding to L clusters with larger cluster center values to have a high data cache value, and determining logical partitions corresponding to the other clusters to have a low data cache value.

As an example, for the first moment or period of time, the data cache values of respective logical partitions may be preset.

Those skilled in the art should understand that the number of times of access being used as the access information in the above is only an example, and a size of data corresponding to the access request may also be used as the access information. In this case, the above clustering operation is for the size of data. In addition, both the number of times of access and the size of the data may be used as the access information.

As an example, referring to FIG. 2, a logical partition-cache value mapping table may be established based on the obtained data cache values of the logical partitions. The table may indicate whether the data cache value of the logical partition is high or low. For example, a data cache value of the logical partitions with high data cache values may be set to be 1, and a data cache value of logical partitions with low data cache values may be set to be 0. The logical partition-data cache value mapping table may be stored in a record file. The mapping table may be updated over time.

Returning to FIG. 1, in operation S102, it is determined whether the cache value of the data meets a preset condition.

As an example, the preset condition may be that the cache value of the data is a high cache value or the logical partition to which the logical address of the data belongs has a high data cache value.

As an example, the cache value of the data may also be indicated by an order number for clustering results after the numbers of times of access to respective logical partitions are clustered, wherein the order number is obtained based on sizes of center values corresponding to a plurality of clusters obtained by the clustering respectively, and correspondingly, the preset condition may be that an order number of the logical partition corresponding to the data is smaller than a preset value.

As an example, the data cache value of the logical partition corresponding to the data may be determined according to the mapping table, and whether the cache value of the data meets the preset condition is determined according to the determined data cache value. Referring to FIG. 2, the IO cache value identifier may identify whether the logical partition corresponding to an access request corresponds to a high data cache value or a low data cache value based on the logical partition-cache value mapping table.

Referring to FIG. 2, the IO dispatcher may determine a specific dispatching strategy based on an identification result of the IO cache value identifier. For example, referring back to FIG. 1, in operation S103, if the cache value of the data meets the preset condition, it is determined that the data corresponding to the access request is accessed from a cache device.

In operation S104, if the cache value of the data does not meet the preset condition, it is determined that the data corresponding to the access request is accessed from a storage device.

As an example, when the access request is a write request, if the cache value of the data meets the preset condition, it is determined that the data corresponding to the write request is written into the cache device, and if the cache value of the data does not meet the preset condition, it is determined that the data corresponding to the write request is written into the storage device.

As an example, if the cache value of the data does not meet the preset condition, after the data corresponding to the write request is written into the storage device, the data corresponding to the logical partition in the cache may be invalidated if there is data corresponding to the logical partition corresponding to the data in the cache device.

For example, when the logical partition corresponding to the write request (or data corresponding to the write request) has a high data cache value, the data is written into the cache device. Because it is likely that the data will be accessed frequently, writing the data to the cache device may reduce the latency for reading and writing of the data. When the logical partition corresponding to the write request (or data corresponding to the write request) has a low data cache value, the data is written into the back-end storage device. Because it is likely that the data will not be accessed frequently, writing the data into the back-end storage device may avoid cache pollution.

As an example, when the access request is a read request, if the cache value of the data meets the preset condition, it is determined that the data corresponding to the read request is read from the cache device, and if the cache value of the data does not meet the preset condition, it is determined that the data corresponding to the read request is read from the storage device.

For example, when the cache value of the data corresponding to the read request (or the logical partition corresponding to the data) is high, it is likely that the data is in the cache device, so it is likely that the data may be read when it is read directly from the cache device. When the cache value of the data corresponding to the read request (or the logical partition corresponding to the data) is low, it is likely that the data is in the back-end storage device, and thus, if the data is directly read from the back-end storage device, and it is likely that the data is read, thereby avoiding a time delay for reading the data.

As an example, if the cache value of the data meets the preset condition, and the data corresponding to the read request is not hit from the cache device, it is determined that the data corresponding to the read request is read from the storage device.

As an example, the data corresponding to the read request may also be written into the cache device. Because the data has a high data cache value, the data is written into the cache device, and the data may be quickly read from the cache device when the data is read next time, thereby reducing a time delay for reading the data.

As described above, methods for data caching may store data that is frequently accessed in a cache device with good performance, and store data on that is infrequently accessed in a back-end storage device, thereby ensuring that data in the cache device is data that is frequently accessed. When data is read, if the data has a high data cache value, the data is read from the cache device, and if the data has a low data cache value, the data is read from the back-end storage device. Because the data is stored according to the cache value of the data, it is likely that the data to be read will be directly hit, which may significantly reduce a time delay of reading and writing the data, thereby improving the performance of the storage system.

Figure 4:
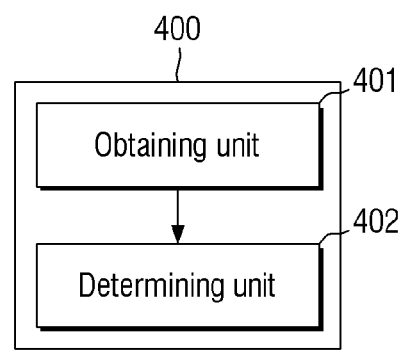
FIG. 4 is a block diagram illustrating a structure of a device for data caching 400 according to an embodiment.

The method for data caching according to an embodiment is described above with reference to FIGS. 1-3. A device for data caching, a data storage system, and a data storage device according to embodiments will be described below with reference to FIGS. 4-8. FIG. 4 is a block diagram illustrating a structure of a device for data caching 400 according to an embodiment.

Referring to FIG. 4, the device for data caching 400 may include a obtaining unit 401, and a determining unit 402. Those skilled in the art should understand that the device for data caching 400 may additionally include other components, and at least one of components in the device for data caching 400 may be divided or combined. The obtaining unit 401 and the determining unit 402 may be implemented by one or more hardware circuits, including various processors, controllers and storage devices.

As an example, the obtaining unit 401 may be configured to obtain a cache value of data corresponding to an access request to a storage device in response to the access request.

As an example, the determining unit 402 may be configured to determine to access the data corresponding to the access request from a cache device if the cache value of the data meets a preset condition, and determine to access the data corresponding to the access request from the storage device if the cache value of the data does not meet the preset condition.

As an example, the storage device may be divided into a plurality of logical partitions, and each logical partition may have a corresponding data cache value. The obtaining unit 401 may be configured to determine a logical partition to which a logical address of the data corresponding to the access request belongs, and to obtain a data cache value of the logical partition to which the logical address of the data belongs as the cache value of the data corresponding to the access request.

As an example, the cache value of the data corresponding to the access request is obtained according to historical access information of the logical partition to which the logical address of the data belongs.

As an example, when the access request is a write request, the determining unit 402 may be configured to determine to write the data corresponding to the write request into the cache device if the cache value of the data meets the preset condition; and determine to write the data corresponding to the write request into the storage device if the cache value of the data does not meet the preset condition.

As an example, when the access request is a read request, the determining unit 402 may be configured to determine to read the data corresponding to the read request from the cache device if the cache value of the data meets the preset condition, and determine to read the data corresponding to the read request from the storage device if the cache value of the data does not meet the preset condition.

As an example, the determining unit 402 may further be configured to determine to read the data corresponding to the read request from the cache device, if the cache value of the data meets the preset condition and the data corresponding to the read request is not hit from the cache device.

As an example, the device 400 for caching data may further include writing unit configured to write the data corresponding to the read request into the cache device.

As an example, the obtaining unit 401 is configured to input the historical access information of the logical partition to which the logical address of the data belongs and historical access information of other logical partitions within the same time period into a trained predictor to predict the data cache value of the logical partition to which the logical address of the data belongs, wherein the other logical partitions are a preset number of logical partitions adjacent to the logical partition to which the logical address of the data corresponding to the access request belongs.

The device for data caching according to an embodiment may store data that is frequently accessed in a cache device with good performance (e.g., SCM, Samsung Z-SSD, PRAM, SLC SSD, or the like), and store data on that is not infrequently accessed in a back-end storage device (e.g., MTC SSD, TLC SSD, QLC SSD, HDD, or the like), thereby ensuring that data in the cache device is data that frequently accessed. When the data is read, if the data has a high data cache value, the data is read from the cache device, and if the data has a low data cache value, the data is read from the back-end storage device, and because the data is stored according to the cache value of the data, it is likely that the data to be read will be directly hit, which may significantly reduce a time delay of reading and writing the data, thereby improving the performance of the storage system.

Figure 5:
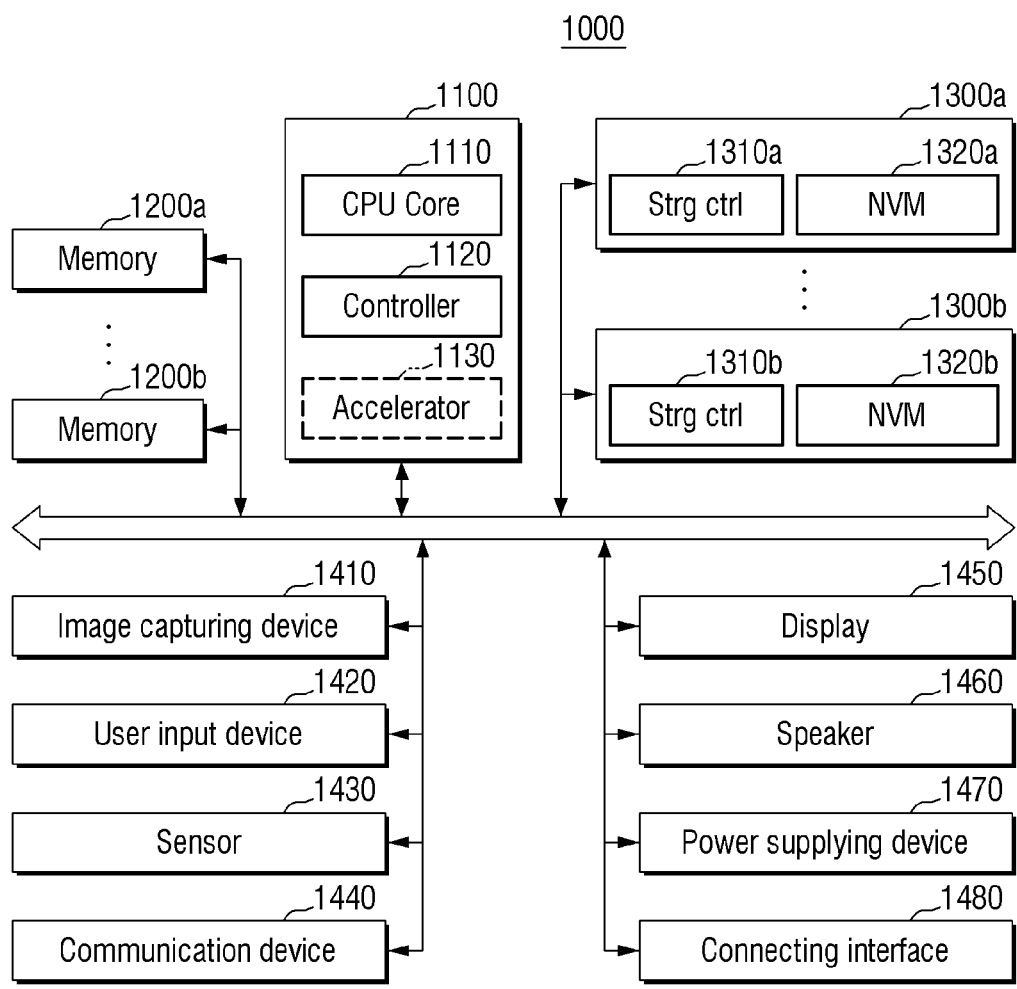
FIG. 5 is a schematic diagram of a system 1000 to which a storage device is applied, according to an embodiment.

FIG. 5 is a schematic diagram of a system 1000 to which a storage device is applied according to an embodiment.

The system 1000 of FIG. 5 may be a mobile system, such as a portable communication terminal (e.g., a mobile phone), a smartphone, a tablet personal computer (PC), a wearable device, a healthcare device, or an Internet of things (IOT) device. However, the system 1000 of FIG. 5 is not necessarily limited to the mobile system and may be a PC, a laptop computer, a server, a media player, or an automotive device (e.g., a navigation device).

Referring to FIG. 5, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, including operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, stage-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and Non-Volatile Memories (NVM) 1320a and 1320b configured to store data via the control of the storage controllers 1310a and 1310b. For example, the NVMs 1320a and 1320b may include flash memories having a two-dimensional (2D) structure, a three-dimensional (3D) V-NAND structure, or other type of NVM, such as PRAM and/or RRAM.

Within the system 1000, the storage devices 1300a and 1300b may be physically separated from the main processor 1100 or implemented in the same package as the main processor 1100. In addition, the storage devices 1300a and 1300b may have storage devices, such as solid-state devices (SSDs) or memory cards, that can be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical characteristics, which may be obtained from the outside of the system 1000, and convert the detected physical characteristics into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

For example, the NVMs 1320a and 1320b may include a first storage device that is a high speed storage device, and a second storage device that is slower than the first storage device. The second storage device may have a larger capacity than the first storage device. For example, the first storage device may be SCM, Samsung Z-SSD, PRAM, SLC SSD, or the like, and the second storage device may be an MTC SSD, TLC SSD, QLC SSD, HDD, or the like. The first storage device may be a cache device, and the second storage device may be a storage device. The main processor 1100 and/or the storage controllers 1310a and 1310b may control the system 1000 to read and store information in the nonvolatile memories 1320a and 1320b in a manner consistent with the method for data caching as described above.

Figure 6:
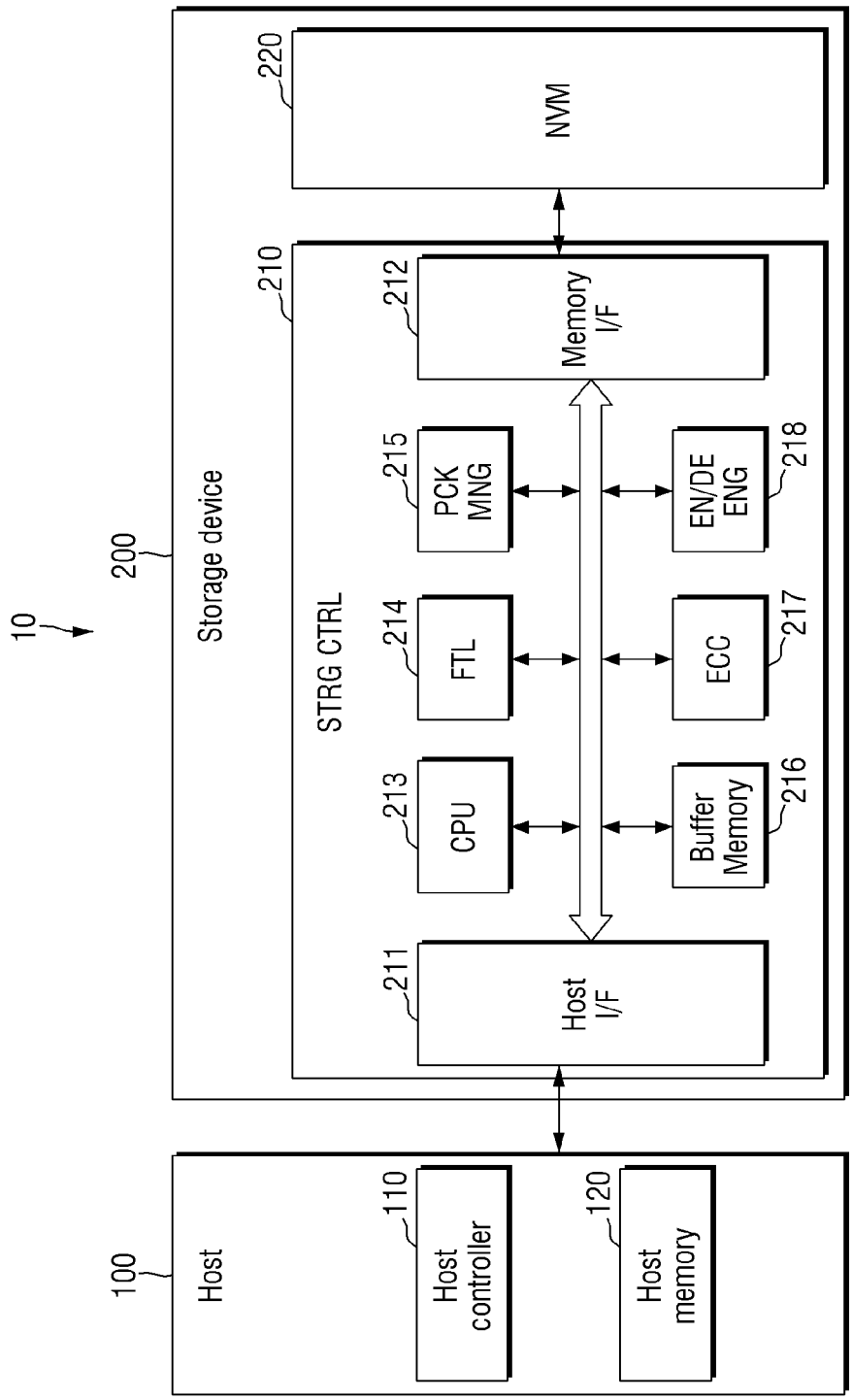
FIG. 6 is a block diagram of a host storage system 10 according to an embodiment.

FIG. 6 is a block diagram of a host storage system 10 according to an embodiment.

The host storage system 10 may include a host 100 and a storage device 200. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 110 and the host memory 120 may be implemented as separate semiconductor chips. Alternatively, in some embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controllers 210 may further include a flash translation layer (FTL) 214, a packet manager 215, a buffer memory 216, an error correction code (ECC) engine 217, and an advanced encryption standard (AES) engine 218. The storage controllers 210 may further include a working memory in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

According to an embodiment, the NVM 220 may include a first storage device that is a high speed storage device, and a second storage device that is slower than the first storage device. The second storage device may have a larger capacity than the first storage device. For example, the first storage device may be SCM, Samsung Z-SSD, PRAM, SLC SSD, or the like, and the second storage device may be an MTC SSD, TLC SSD, QLC SSD, HDD, or the like. The first storage device may be a cache device, and the second storage device may be a storage device. The host 100 and/or the storage controller 210 may control the host storage system 10 to read and store information in the NVM 220 in a manner consistent with the method for data caching as described above.

Figure 7:
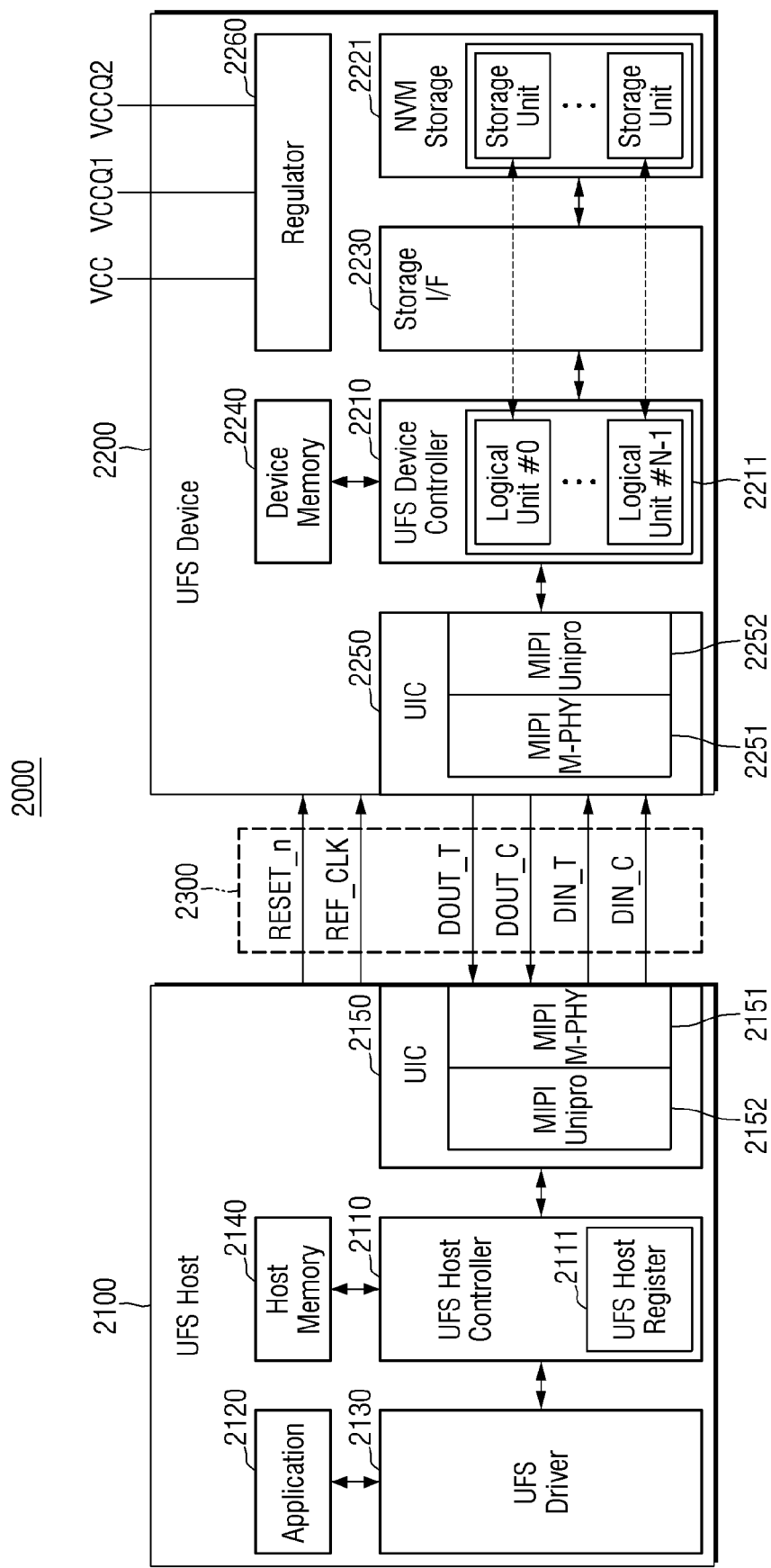
FIG. 7 is a block diagram of a UFS system 2000 according to an embodiment.

FIG. 7 is a block diagram of a UFS system 2000 according to an embodiment.

The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 5 may also be applied to the UFS system 2000 of FIG. 7 within a range that does not conflict with the following description of FIG. 7.

Referring to FIG. 7, the UFS host 2100 may be connected to the UFS device 2200 through the UFS interface 2300. When the main processor 1100 of FIG. 5 is an AP, the UFS host 2100 may be implemented as a portion of the AP. The UFS host controller 2110 and the host memory 2140 may respectively correspond to the controller 1120 of the main processor 1100 and the memories 1200a and 1200b of FIG. 5. The UFS device 2200 may correspond to the storage device 1300a and 1300b of FIG. 5, and a UFS device controller 2210 and an NVM 2220 may respectively correspond to the storage controllers 1310a and 1310b and the NVMs 1320a and 1320b of FIG. 5.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 7, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 7, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine. The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array and a control circuit configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage to the UFS device controller 2210 and be in a range of 1.14 V to 1.26 V. The voltage VCCQ2 may be a power supply voltage for supplying a voltage, which is lower than the voltage VCC and higher than the voltage VCCQ, to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

For example, the NVM 2220 may include a first storage device that is a high speed storage device, and a second storage device that is slower than the first storage device. The second storage device may have a larger capacity than the first storage device. For example, the first storage device may be SCM, Samsung Z-SSD, PRAM, SLC SSD, or the like, and the second storage device may be an MTC SSD, TLC SSD, QLC SSD, HDD, or the like. The first storage device may be a cache device, and the second storage device may be a storage device. The UFS host 2100 and/or the UFS device 2200 may be configured to control the UFS system 2000 to execute the method for data caching as described above.

Figure 8:
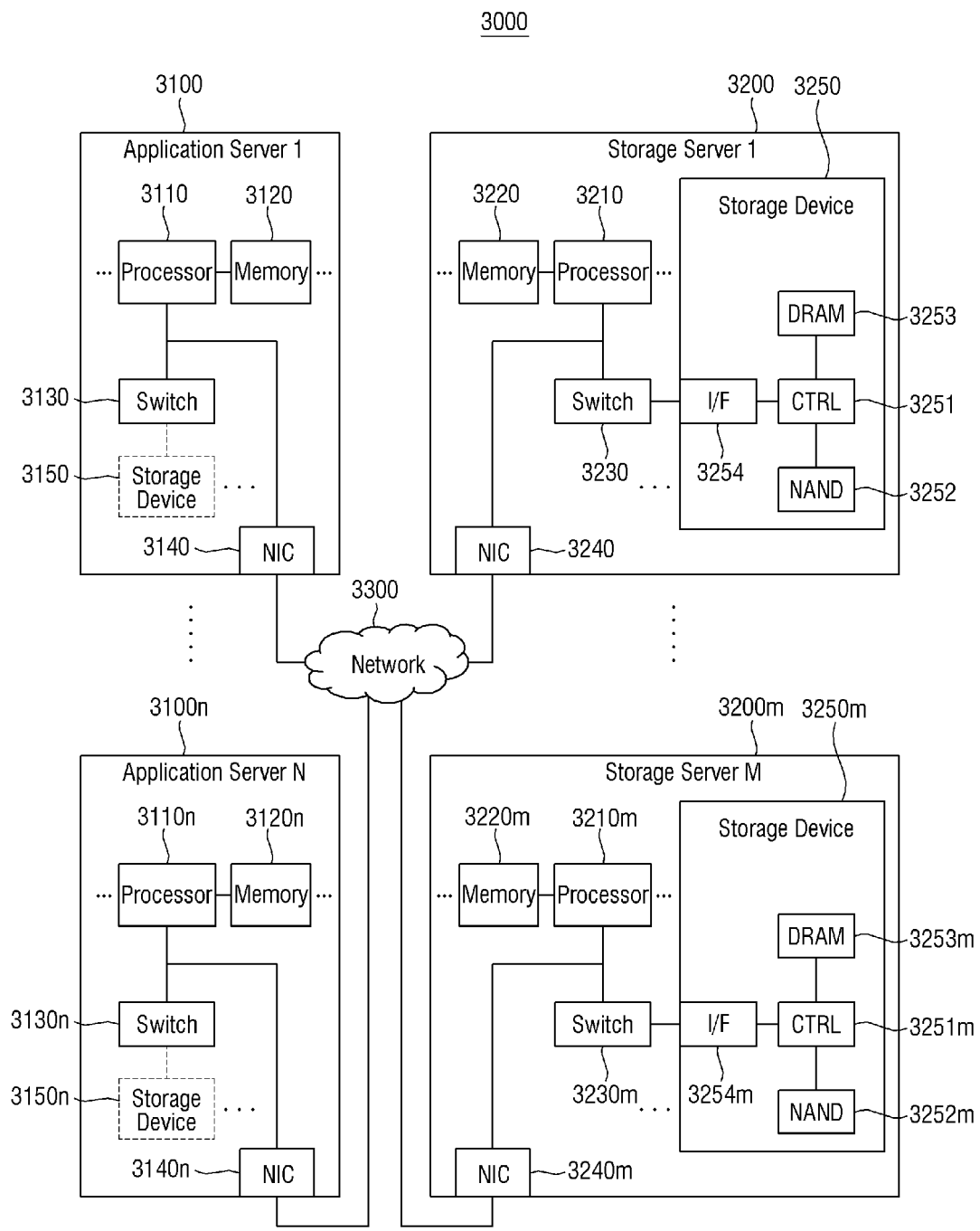
FIG. 8 is a diagram of a data center 3000 to which storage devices are applied according to an embodiment.

FIG. 8 is a diagram of a data center 3000 to which a storage device is applied according to an embodiment.

Referring to FIG. 8, the data center 3000 may be a facility that collects various types of pieces of data, provides services and be referred to as a data storage center. The data center 3000 may be a system for operating a search engine and a database, and may be a computing system used by companies, such as banks, or government agencies. The data center 3000 may include application servers 3100 to 3100$n$ and storage servers 3200 to 3200$m$. The number of application servers 3100 to 3100$n$ and the number of storage servers 3200 to 3200$m$ may be variously selected according to embodiments. The number of application servers 3100 to 3100$n$ may be different from the number of storage servers 3200 to 3200$m$.

The application server 3100 or the storage server 3200 may include at least one of processors 3110 and 3210, as well as memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

The application servers 3100 to 3100$n$ may communicate with the storage servers 3200 to 3200$m$ through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200$m$ may be provided as file storages, block storages, or object storages according to an access method of the network 3300.

In an embodiment, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will be described. A description of the application server 3100 may be applied to another application server 3100$n$, and a description of the storage server 3200 may be applied to another storage server 3200$m$.

The application server 3100 may store data, which is requested by a user or a client to be stored, in one of the storage servers 3200 to 3200$m$ through the network 3300. Also, the application server 3100 may obtain data, which is requested by the user or the client to be read, from one of the storage servers 3200 to 3200$m$ through the network 3300. For example, the application server 3100 may be implemented as a web server or a database management system (DBMS).

The application server 3100 may access a memory 3120$n$ or a storage device 3150$n$, which is included in another application server 3100$n$, through the network 3300. Alternatively, the application server 3100 may access memories 3220 to 3220$m$ or storage devices 3250 to 3250$m$, which are included in the storage servers 3200 to 3200$m$, through the network 3300. Thus, the application server 3100 may perform various operations on data stored in application servers 3100 to 3100$n$ and/or the storage servers 3200 to 3200$m$. For example, the application server 3100 may execute an instruction for moving or copying data between the application servers 3100 to 3100$n$ and/or the storage servers 3200 to 3200$m$. In this case, the data may be moved from the storage devices 3250 to 3250$m$ of the storage servers 3200 to 3200$m$ to the memories 3120 to 3120$n$ of the application servers 3100 to 3100$n$ directly or through the memories 3220 to 3220$m$ of the storage servers 3200 to 3200$m$. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC(Network InterConnect) 3240. The switch 3230 may selectively connect the processor 3210 to the storage device 3250 or selectively connect the NIC 3240 to the storage device 3250 via the control of the processor 3210.

In an embodiment, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

In the storage servers 3200 to 3200$m$ or the application servers 3100 to 3100$n$, a processor may transmit a command to storage devices 3150 to 3150$n$ and 3250 to 3250$m$ or the memories 3120 to 3120*n* and 3220 to 3220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150*n* and 3250 to 3250*m* may transmit a control signal and a command/address signal to NAND flash memory devices 3252 to 3252*m* in response to a read command received from the processor. Thus, when data is read from the NAND flash memory devices 3252 to 3252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In an embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210*m* of another storage server 3200*m*, or the processors 3110 and 3110*n* of the application servers 3100 and 3100*n*. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

For example, the storage devices 3150 to 3150*n* and the storage devices 3250 to 3250*m* may each include a first storage device that is a high speed storage device, and a second storage device that is slower than the first storage device. The second storage device may have a larger capacity than the first storage device. For example, the first storage device may be SCM, Samsung Z-SSD, PRAM, SLC SSD, or the like, and the second storage device may be an MTC SSD, TLC SSD, QLC SSD, HDD, or the like. The first storage device may be a cache device, and the second storage device may be a storage device. The processors 3110 to 3110*n* and 3210 to 3210*m* may control application servers 3100 to 3100*n* and the storage servers 3200 to 3200*m* to read and store information in the storage devices 3150 to 3150*n* and the storage devices 3250 to 3250*m* in a manner consistent with the method for data caching as described above. According to an embodiment, a data center system (for example, 3000) is provided, including: a plurality of application servers (for example, 3100-3100*n*); and a plurality of storage servers (for example, 3200-3200*m*), wherein each storage server includes a storage device, and at least one of the plurality of application servers and the plurality of storage servers is configured to perform the method for data caching as described above.

According to an embodiment, there is provided a computer-readable storage medium storing a computer program, when executed by a processor, implementing the method for data caching as described above.

According to an embodiment, there is provided an electronic apparatus, including: a processor; and a memory storing a computer program, when executed by the processor, implementing the method for data caching as described above.

According to an embodiment, there may also be provided a computer-readable storage medium storing instructions, when executed by at least one processor, causing the at least one processor to execute the method for data caching according to the present disclosure. Examples of computer-readable storage media here include non-transitory media, such as: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state Hard disk (SSD), card storage (such as multimedia card, secure digital (SD) card or extreme digital (XD) card), magnetic tape, floppy disk, magneto-optical data storage device, optical data storage device, hard disk, solid state disk and any other devices configured to store computer programs and any associated data, data files, and data structures in a non-transitory manner, and provide the computer programs and any associated data, data files, and data structures to the processor or the computer, so that the processor or the computer can execute the computer program. The computer program in the above-mentioned computer-readable storage medium may run in an environment deployed in computing equipment such as a client, a host, an agent device, a server, etc. In addition, in one example, the computer program and any associated data, data files and data structures are distributed on networked computer systems, so that computer programs and any associated data, data files, and data structures are stored, accessed, and executed in a distributed manner through one or more processors or computers.

In some embodiments, each of the components, elements, modules or units represented by a block as illustrated in FIG. 2-8 may be implemented as various numbers of hardware, software and/or firmware structures that execute respective functions described above, according to example embodiments. For example, at least one of these components, elements, modules or units may include various hardware components including a digital circuit, a programmable or non-programmable logic device or array, an application specific integrated circuit (ASIC), or other circuitry using use a direct circuit structure, such as a memory, a processor, a logic circuit, a look-up table, etc., that may execute the respective functions through controls of one or more microprocessors or other control apparatuses. Also, at least one of these components, elements, modules or units may include a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

Each of the embodiments provided in the above description is not excluded from being associated with one or more features of another example or another embodiment also provided herein or not provided herein but consistent with the inventive concept. For example, even if matters described in a device for data caching of an embodiment, are not described in a device for data caching of another embodiment, the matters may be understood as being related to or combinable with the different example or embodiment, unless otherwise mentioned in descriptions thereof. In addition, it should be understood that all descriptions of principles, aspects, examples, and specific embodiments of the inventive concept are intended to encompass structural and functional equivalents thereof. In addition, these equivalents should be understood as including not only currently well-known equivalents but also equivalents to be developed in the future, that is, all devices invented to perform the same functions regardless of the structures thereof.

While aspects of embodiments have been particularly shown and described, it will be understood that various changes in form and details may be made therein without departing from the spirit and scope of the following claims.

What is claimed is:

1. A method comprising:
controlling a plurality of access operations to a plurality of logical partitions of a storage device;
counting a number of times each of the plurality of logical partitions is accessed with respect to the plurality of access operations;
obtaining a plurality of cache values respectively corresponding to the plurality of logical partitions, based on the number of times each of the plurality of logical partitions is accessed, wherein each of the plurality of cache values indicates a high data cache value indicating a corresponding logical partition has a high access frequency or a low data cache value indicating the corresponding logical partition has a low access frequency,
obtaining a cache value of a logical partition, from among the plurality of logical partitions corresponding to an access request, wherein the obtaining the cache value comprises providing historical access information of the logical partition to which a logical address of the data belongs and historical access information of other logical partitions to a trained predictor and obtaining a data cache value of the logical partition as the cache value from the trained predictor; and
determining to access data corresponding to the access request from a cache device or the storage device based on whether the cache value meets a preset condition,
wherein the other logical partitions comprise M logical partitions that precede the logical partition to which the logical address of the data belongs and M logical partitions that follow the logical partition to which the logical address of the data belongs, M being a positive integer.

2. The method of claim 1, wherein the obtaining the cache value comprises:
determining the logical partition, from among the plurality of logical partitions, based on the logical address of the data,
wherein each of the plurality of logical partitions has a corresponding data cache value.

3. The method of claim 2, further comprising generating historical access information based on the plurality of access operations,
wherein the obtaining the plurality of cache values is based on the historical access information.

4. The method of claim 1, wherein the access request is a write request, and
wherein the determining comprises:
determining to write the data corresponding to the write request into the cache device, based on the cache value meeting the preset condition; and
determining to write the data corresponding to the write request into the storage device, based on the cache value not meeting the preset condition.

5. The method of claim 1, wherein the access request is a read request, and
wherein the determining comprises:
determining to read the data corresponding to the read request from the cache device, based on the cache value meeting the preset condition; and
determining to read the data corresponding to the read request from the storage device, based on the cache value not meeting the preset condition.

6. The method of claim 1, wherein the access request is a read request,
wherein the cache value meets the preset condition, and
wherein the method further comprises: determining to read the data corresponding to the read request from the storage device based on the data corresponding to the read request not being hit from the cache device.

7. The method of claim 6, further comprising writing the data corresponding to the read request into the cache device.

8. A device comprising:
a cache device;
a storage device comprising a plurality of logical partitions;
one or more memories storing instructions; and
one or more processors configured to execute the instructions to implement:
a read and write unit configured to control a plurality of access operations to the plurality of logical partitions;
an IO collector configured to count a number of times each of the plurality of logical partitions is accessed with respect to the plurality of access operations;
an obtaining unit configured to obtain a plurality of cache values respectively corresponding to the plurality of logical partitions, based on the number of times each of the plurality of logical partitions is accessed, and obtain a cache value of a logical partition, from among the plurality of logical partitions corresponding to an access request, wherein the obtaining unit is configured to obtain the cache value by providing historical access information of the logical partition to which a logical address of data belongs and historical access information of other logical partitions to a trained predictor and obtaining a data cache value of the logical partition as the cache value from the trained predictor; and
a determining unit configured to determine whether to access data corresponding to the access request from the cache device or the storage device based on whether the cache value meets a preset condition,
wherein each of the plurality of cache values indicates a high data cache value indicating a corresponding logical partition has a high access frequency or a low data cache value indicating the corresponding logical partition has a low access frequency,
wherein the other logical partitions comprise M logical partitions that precede the logical partition to which the logical address of the data belongs and M logical partitions that follow the logical partition to which the logical address of the data belongs, M being a positive integer.

9. The device of claim 8, wherein the obtaining unit is further configured to determine the logical partition, from among the plurality of logical partitions based on the logical address of the data and obtain the data cache value of the logical partition as the cache value of the data, and
wherein each of the plurality of logical partitions has a corresponding data cache value.

10. The device of claim 9, wherein the obtaining unit is further configured to generate historical access information based on the plurality of access operations and obtain the plurality of cache values based on the historical access information.

11. The device of claim 8, wherein the determining unit is further configured to, based on the access request being a write request, determine to write the data corresponding to the write request into the cache device based on the cache value of the data meeting the preset condition, and determine to write the data corresponding to the write request into the storage device based on the cache value of the data not meeting the preset condition.

12. The device of claim 8, wherein the determining unit is further configured to, based on the access request being a read request, determine to read the data corresponding to the read request from the cache device based on the cache value of the data meeting the preset condition, and determine to read the data corresponding to the read request from the storage device based on the cache value of the data not meeting the preset condition.

13. The device of claim 12, wherein the determining unit is further configured to determine to read the data corresponding to the read request from the storage device, based on the cache value of the data meeting the preset condition and the data corresponding to the read request not being hit from the cache device.

14. The device of claim 13, wherein the one or more processors are further configured to execute the instructions to implement a writing unit configured to write the data corresponding to the read request not hit from the cache device into the cache device.

15. The device of claim 8, wherein the one or more memories and the one or more processors are provided in a host device, and
wherein the device further comprises an external storage device comprising the cache device and the storage device.

16. The device of claim 8, wherein the one or more memories and the one or more processors are provided in a Universal Flash Storage (UFS) host, and wherein the device further comprises:
a UFS device; and
a UFS interface configured to communicably couple the UFS host and the UFS device.

17. The device of claim 8, wherein the one or more memories and the one or more processors are provided in an storage server provided in a data center system, and
wherein the data center system comprises:
a plurality of application servers; and
a plurality of storage servers, wherein the storage server is one of the plurality of storage servers.

18. A computer-readable storage medium storing a computer program which, when executed by a processor, is configured to control the processor to perform a method comprising:
controlling a plurality of access operations to a plurality of logical partitions of a storage device;
counting a number of times each of the plurality of logical partitions is accessed with respect to the plurality of access operations;
obtaining a plurality of cache values respectively corresponding to the plurality of logical partitions, based on the number of times each of the plurality of logical partitions is accessed, wherein each of the plurality of cache values indicates a high data cache value indicating a corresponding logical partition has a high access frequency or a low data cache value indicating the corresponding logical partition has a low access frequency,
obtaining a cache value of a logical partition, from among the plurality of logical partitions corresponding to an access request, wherein the obtaining the cache value comprises providing historical access information of the logical partition to which a logical address of data belongs and historical access information of other logical partitions to a trained predictor and obtaining a data cache value of the logical partition as the cache value from the trained predictor; and
determining whether to access data corresponding to the access request from a cache device or the storage device based on whether the cache value meets a preset condition,
wherein the other logical partitions comprise M logical partitions that precede the logical partition to which the logical address of the data belongs and M logical partitions that follow the logical partition to which the logical address of the data belongs, M being a positive integer.

* * * * *